US006553219B1

United States Patent
Vilander et al.

(10) Patent No.: US 6,553,219 B1
(45) Date of Patent: Apr. 22, 2003

(54) MOBILE INTERNET ACCESS SYSTEM AND METHOD MAPPING MOBILE TO INTERNET SERVICE PROVIDER

(75) Inventors: Harri Tapani Vilander, Espoo (FI); Petri Jokela, Espoo (FI); Martti Kuparinen, Espoo (FI); Raimo Vuopionperä, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/537,400

(22) Filed: Mar. 29, 2000

(30) Foreign Application Priority Data

Apr. 8, 1999 (GB) ................................ 9907899

(51) Int. Cl.[7] .............................................. H04M 1/66
(52) U.S. Cl. ........................................ 455/411; 455/435
(58) Field of Search ............................... 455/411, 435, 455/436, 437, 438, 439, 406, 432, 465, 433, 440, 445, 554, 555, 560, 551, 422, 414, 415; 370/352

(56) References Cited

U.S. PATENT DOCUMENTS

| 5,603,081 A | * | 2/1997 | Raith et al. ............... 455/33.1 |
| 5,670,950 A | | 9/1997 | Otsuka |
| 5,881,234 A | | 3/1999 | Schwob |
| 6,064,887 A | * | 5/2000 | Kallioniemi et al. ........ 455/445 |
| 6,073,015 A | * | 6/2000 | Berggren et al. ............ 455/432 |
| 6,327,267 B1 | * | 12/2001 | Valentine et al. ........... 370/466 |
| 6,330,448 B1 | * | 12/2001 | Otsuka et al. ............... 455/436 |
| 2001/0022784 A1 | * | 9/2001 | Menon et al. ............... 370/352 |
| 2002/0057673 A1 | * | 5/2002 | Melen ......................... 370/352 |

FOREIGN PATENT DOCUMENTS

| WO | 98/32299 A | 7/1998 |
| WO | WO 99/01969 | 1/1999 |

OTHER PUBLICATIONS

C. Mun–Kein, "Around the World With Internet Roaming," *Telecommunications*, Jul. 1, 1997, pp. 55–56, XP000770945, ISN: 0040–2494, Dedham, Massachusetts.

* cited by examiner

Primary Examiner—Lester G. Kincaid
Assistant Examiner—Naghmeh Mehrpour
(74) Attorney, Agent, or Firm—Nixon & Vanderhye P.C.

(57) ABSTRACT

A method of authenticating a mobile wireless terminal 9 in a mobile telecommunications network, the terminal 9 being a subscriber of an Internet Service Provider (ISP) 11 rather than of a mobile network. The terminal 9 is allocated an International Mobile Identity (IMI) which is transmitted from the terminal 9 to a mobile network when the terminal 9 wishes to register with the network. A country code part and an operator ID part of the IMI are used by the network to determine the Internet Protocol (IP) address of the terminal's home ISP 11, which is then contacted by the network over the Internet to authenticate the mobile terminal 9.

8 Claims, 3 Drawing Sheets

MOBILE INTERNET ACCESS SYSTEM AND METHOD MAPPING MOBILE TO INTERNET SERVICE PROVIDER

FIELD OF THE INVENTION

The present invention relates to mobile Internet access and more particularly to Internet access obtained using mobile terminals coupled to the Internet via a communications access network.

BACKGROUND TO THE INVENTION

Two of the technological fields which have undergone the greatest growth in the last decade are the Internet and mobile wireless telecommunications. It is not perhaps surprising therefore that a degree of fusion between these two fields is expected in the very near future. Indeed, operators of mobile networks are already facilitating Internet access for mobile wireless terminals for the purpose of full blown Internet access or to support limited "smart" messaging systems able to deliver information such as financial data, weather forecasts etc. on demand. At present, in order to access the Internet via a mobile telecommunications network, the mobile terminal (or rather the user of the terminal) must subscribe to a mobile network. This subscription may be either to the access network itself, or to some foreign network with which the operator of the access network has concluded a suitable agreement.

In the European Global System for Mobile communications (GSM), subscribers are allocated a unique International Mobile Subscriber Identity (IMSI) which comprises a country ID part identifying the country where the subscribers home network is located, a home network ID part identifying the subscriber's home network, and a subscriber ID part identifying the subscriber within his home network. The code is stored on a Subscriber Identity Module (SIM) card which is plugged into the subscriber's mobile terminal. Upon registering with a mobile network, the terminal sends the IMSI to the mobile network in order to allow the network operator to verify the identity of the terminal and to establish a billing relationship with the subscriber's home network (if the subscriber is not at home). This authentication process further enables the home network to update its Home Location Register (HLR) which keeps track of the current locations of the home network's subscribers, allowing incoming calls and other signalling information to be forwarded to the correct destination.

In GSM, Internet access is obtained through a conventional circuit switched network. However, there are plans to introduce in the very near future an additional packet switched core network (known as General Packet Radio Service or GPRS) into GSM, which should significantly enhance data services, and in particular Internet access services, available in GSM. A packet switched core network, such as GPRS, will also be included in so-called third generation mobile networks such as Universal Mobile Telecommunications Service (UMTS) networks.

In order to expand their potential markets, the operators of mobile telecommunications networks may in the future conclude agreements with Internet Service Providers (ISPs) to enable subscribers to those ISPs to access the Internet via mobile networks. Thus, in the future, a mobile terminal may not need to subscribe to a mobile network in order to obtain Internet access via a mobile network. Rather, the connection to the Internet via a mobile network may be authorised by a terminal's home ISP, with the home ISP being billed for the connection charge.

Whilst such possible future cooperation between mobile network operators and ISPs opens up the possibilities of improved mobility and an expansion of available services, it also presents certain problems relating to the authentication of mobile terminals and to security within mobile networks.

SUMMARY OF THE INVENTION

It is presently envisaged that future mobile telecommunications systems, such as the proposed third generation Universal Mobile Telecommunications System (UMTS), will continue to make use of International Mobile Subscriber Identities (IMSIs) to facilitate the registration and authentication of mobile terminals. As such, mobile terminal users who do not have a subscription to a mobile network but who subscribe to an Internet Service Provider (ISP), are likely to be allocated IMSIs in the same way as subscribers to mobile networks. Indeed, the term IMSI may be replaced by the more general term International Mobile Identity (IMI) to indicate the broader applicability of this unique identity.

For mobile networks, there is likely to continue to exist dedicated signalling networks interconnecting the mobile networks for the purpose of relaying authentication (and other) messages between networks. For example, such signalling networks may be based upon Signalling System No.7 (SS7) or may use Internet Protocol (IP). However, ISPs are unlikely to be connected directly to dedicated signalling networks and a way must be found for relaying authentication messages between mobile networks and ISPs, based upon the IMI allocated to a subscriber or mobile terminal.

The inventor of the present invention has recognised that it is necessary to provide for a translation, between IMIs and ISP IP addresses, in order to enable signalling information to be routed between mobile networks and ISPs.

According to a first aspect of the present invention, there is provided a method of authenticating a mobile terminal in a communications access network, wherein the mobile terminal subscribes to an Internet Service Provider (ISP) and has a billing relationship therewith, the method comprising:

allocating to the mobile terminal a unique International Mobile Identity (IMI);

transmitting the IMI or a part thereof to an access network as part of an initial registration process for the mobile terminal with the network wherein the IMI or said part thereof identifies said ISP;

receiving the IMI or said part thereof at the access network and using an ISP IP address database to map the IMI or said part thereof to the IP address of the ISP; and transmitting an authentication request from the access network to the ISP over the Internet using the identified IP address.

Preferably, said access network is a mobile telecommunications network and said mobile terminal is a mobile wireless terminal. It is noted that the term "mobile terminal" as used here encompasses stand-alone Internet enabled terminals, combinations of laptop/palmtop computers and mobile telephones, and other such systems. Terminals may comprise SIM cards storing respective IMIs, or an IMI may be stored in a memory of a terminal. Alternatively, the access network may be a fixed line access network, wherein said mobile terminals are connected to the network using a fixed line.

Embodiments of the present invention enable a single IMI format to be used for all mobile terminals regardless of whether or not they subscribe to an access network or to an ISP. Furthermore, ISP IP address databases held by access networks may be easily updated to reflect changes in IP addresses. In the absence of network based databases, it would be difficult or even impossible to change the IP address allocated to an ISP as this would require a change to be made in data held by each and every mobile terminal subscribing to that ISP.

Preferably, the IMI comprises a country code part which identifies the country where the subscriber's home ISP is located, an operator ID part which identifies the home ISP and a subscriber ID part which identifies the terminal or subscriber within the home ISP. More preferably, said ISP IP address database comprises a first field containing country code and operator ID parts in combination, and a second field containing ISP IP addresses, whereby the IP address of an ISP can be determined by searching the database using the country code and operator ID parts supplied by a mobile terminal seeking to register with the access network.

Preferably, the access network is a Universal Mobile Telecommunications System (UMTS) network which comprises a radio access network including a plurality of Radio Network Controllers (RNCs). One or more of the RNCs is connected to the Internet via an Internet Access Server (IAS), wherein the mapping of the IMI or part thereof to an ISP IP address is performed at the RNC responsible for the mobile terminal. Alternatively, an RNC may incorporate certain IAS functionality (including routing functions) allowing the RNC to be connected directly to the Internet.

Preferably, as part of the radio link set-up (or registration) process between the mobile terminal and the network, an authentication certificate is sent, in encrypted form, from the mobile terminal to the network. The certificate is then forwarded by the access network to the ISP which authorises the mobile terminal on the basis of the received certificate. The ISP may then return an authorisation message to the access network either accepting or refusing to authorise the access network.

It is noted that the term "ISP" is intended here to define an operator which provides a service via the Internet. This may be, for example, an operator who provides subscribers with an interface between their telephone connections and the Internet, a conventional telephone network operator, or an operator who provides some other service such as a financial service.

According to a second aspect of the present invention there is provided apparatus for authenticating a mobile terminal in a communications access network, wherein the mobile terminal subscribes to an Internet Service Provider (ISP) and has a billing relationship therewith, the apparatus comprising means arranged within the access network for receiving from the mobile terminal an International Mobile Identity (IMI) or part thereof, means for accessing an ISP IP address database to map the received IMI or part thereof to an IP address of the ISP server, and means for transmitting an authentication request from the access network to the ISP over the Internet using the derived IP address.

Preferably, said access network is a mobile telecommunications network, and the means for accessing said database and for transmitting the authentication request to the ISP are arranged within a Radio Network Controller (RNC) of a radio network part of the mobile telecommunications network.

DETAILED DESCRIPTION OF CERTAIN EMBODIMENTS

Figure 1:
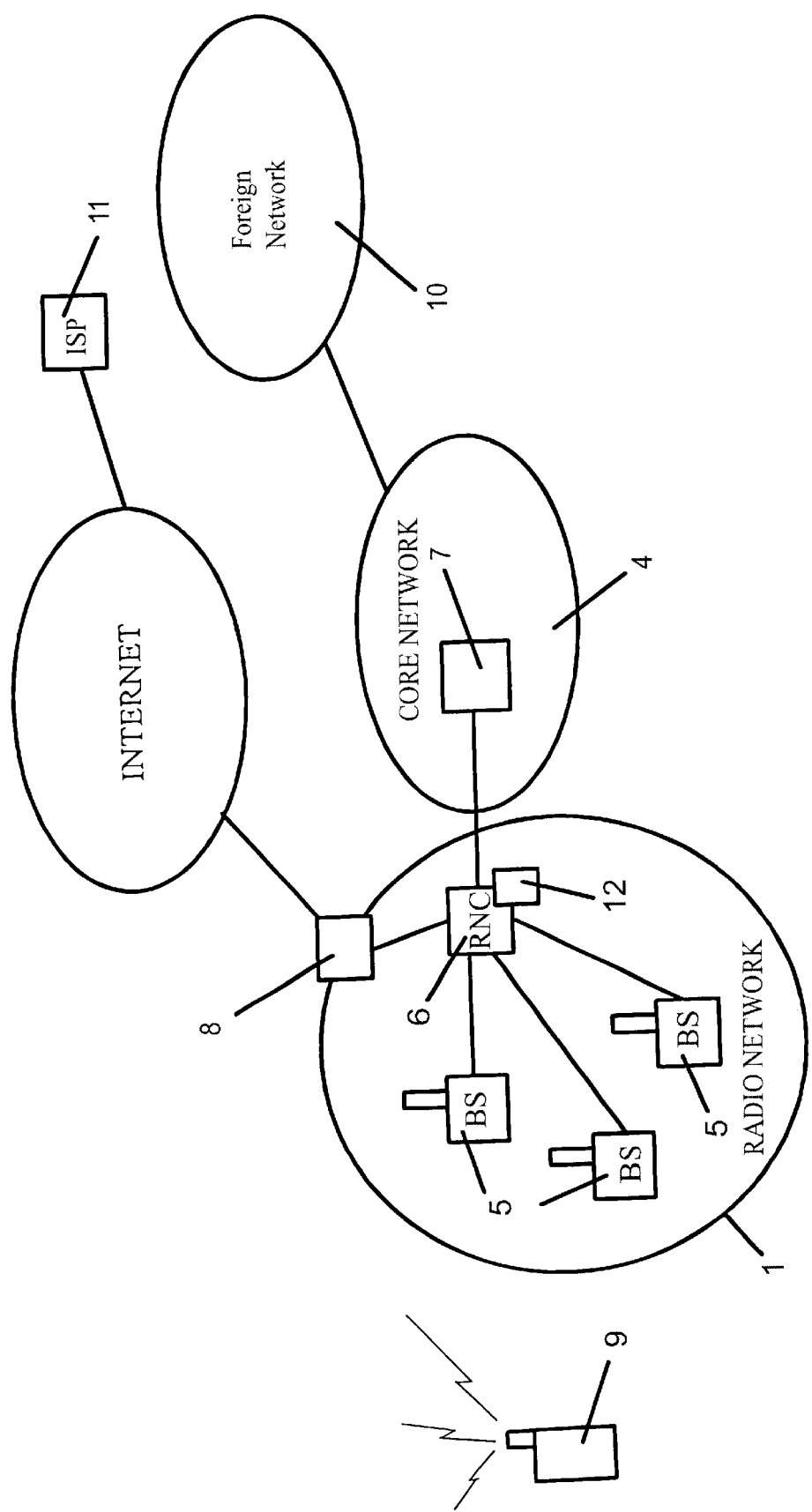
FIG. 1 illustrates schematically a mobile telecommunications network which provides an access network for a mobile terminal to connect to the Internet.

There is illustrated in FIG. 1 a mobile telecommunications network (the "access" network) of the UMTS type. The network comprises a number of sub-networks including a radio network 1 and a packet switched core network 4. The radio network 1 in turn comprises a plurality of Base Stations (BSs) 5 which provide the radio interface between the mobile network and mobile wireless terminals. The Base Stations 5 of the radio network are organised into sets, each set being controlled by a Radio Network Controller (RNC) 6. Each RNC 6 is coupled to the core network 4 and more particularly to one or more serving GPRS Support Nodes (SGSN)/Gateway GPRS Support Nodes (GGSN) 7 which perform inter alia routing functions within the core network. In addition, in order to provide mobile wireless terminals with Direct Internet Access (DIA), each of the RNCs 6 is connected directly to an Internet Access Server (IAS) 8 which provides a gateway for the radio network 1 to the Internet. All mobile terminal users wishing to use the services of the mobile network, either for the purposes of conventional telephony including voice, facsimile, and data services, or to obtain DIA, must have allocated thereto an International Mobile Identity (IMI). Each IMI comprises a country code part identifying the country in which the subscriber's operator (or home agent) is located, an operator ID part, and a subscriber ID part. The IMI may be stored in the mobile terminal itself or on a SIM card inserted into the terminal.

IMI's are allocated by an operator with whom the terminal has established a billing relationship. This may be an access network operator (i.e. a mobile network operator) or an ISP. The nature of a mobile terminal's operator, mobile network or ISP, may be distinguished by a number prefixed to the operator ID part, e.g. a "0" indicating a mobile network and a "1" indicating an ISP. Alternatively, the nature of the operator (or of the core network to be utilised) may be identified in a Radio Resource Control Protocol message/parameter.

FIG. 1 illustrates a mobile wireless terminal 9 which may comprise a palmtop or laptop computer coupled to a mobile telephone or which may be a stand alone device, e.g. an Internet enabled wireless communication device (a "communicator"). Assuming that the user of the mobile terminal 9 has a subscription to the access network or to some foreign mobile network, when the terminal 9 is switched on within the coverage area of the access network (or enters the coverage area of the network), the terminal 9 listens to one or more broadcast channels of the network to establish a radio link with the network. As part of the radio link establishment process or shortly thereafter, the mobile terminal 9 must transmit its IMI code to the network.

If the access network is the home network of the mobile terminal user, then the core network 4 is able to authenticate the user without reference to any other network. However, if the IMI code indicates that the terminal user is a subscriber of some foreign mobile network 10, then the core network 4 passes an authentication request to the appropriate foreign network 10. This process also has the result of informing the foreign network 10 of the current location of the user in order that future calls and other data may be forwarded to the user via the access network.

Following successful registration of the user with the mobile network, the mobile terminal 9 may request Internet access, whereupon the terminal 9 is allocated an Internet Protocol (IP) address either by the radio network or by generating the address itself.

Assume now that, rather than having a subscription to a mobile network, the mobile wireless terminal user has a subscription with an Internet Service Provider (ISP) 11. The nature of the user's home network is identified by a "1" prefixing the operator ID part of the IMI allocated to the user. As before, the IMI is transmitted from the mobile terminal 9 to the mobile network when the mobile terminal 9 sends a Service Request to the mobile network. Before the network proceeds to allocate a radio link to the mobile terminal 9, it must first authenticate the mobile terminal user and establish a billing relationship by contacting the user's home ISP 11.

Figure 2:
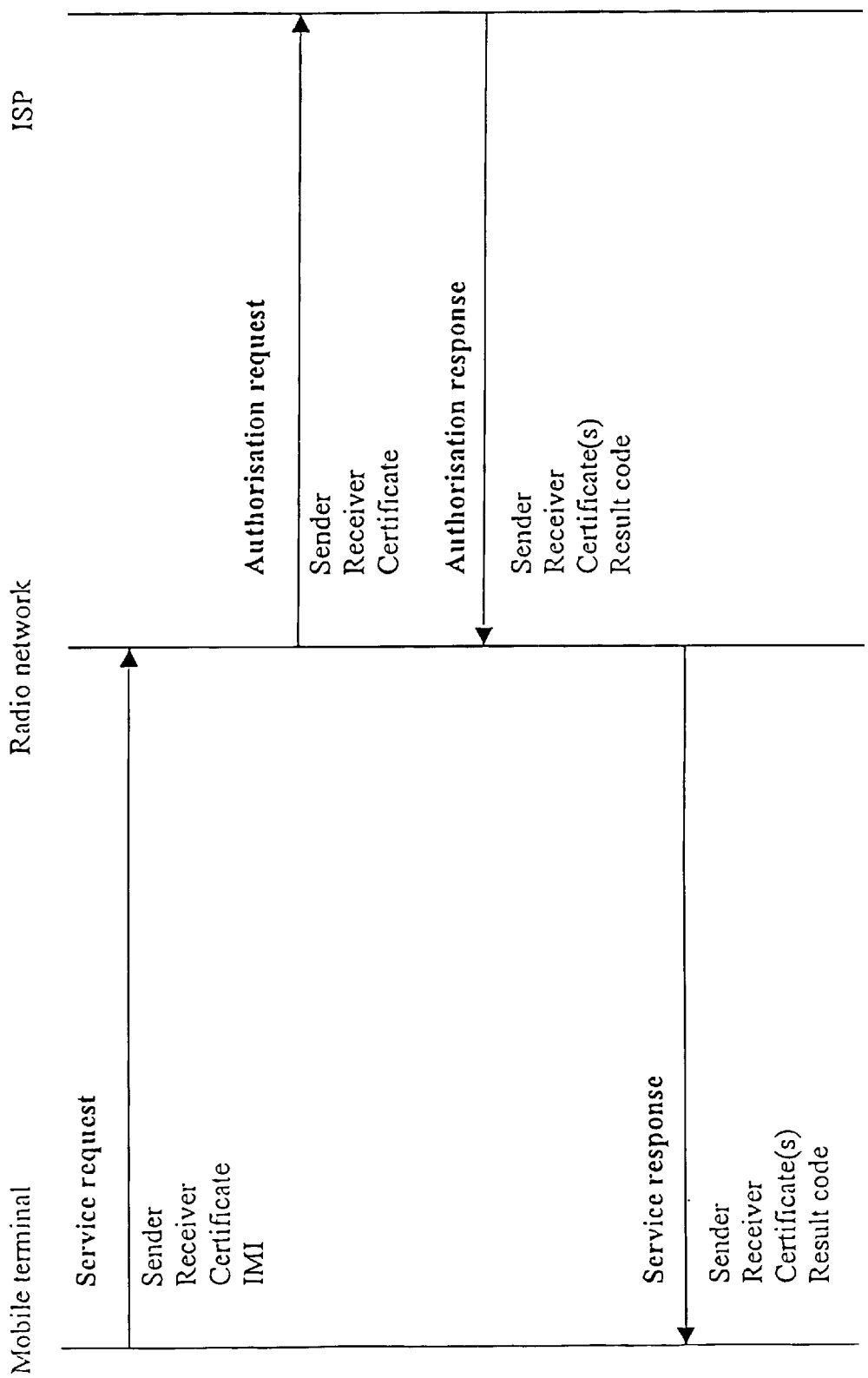
FIG. 2 shows signalling messages transmitted over the network of FIG. 1.

Each of the Radio Network Controllers (RNCs) 6 of the mobile network is provided with a database 12 (or Domain Name Server). The database 12 has a first field containing country code/operator ID pairs, whilst a second field contains ISP IP addresses associated with respective pairs of the first field. The RNC 6 controlling the mobile terminal 9 examines the database to identify the ISP IP address corresponding to the country code/operator ID pair of the IMI received from the mobile terminal 9. Once the ISP's address has been determined, the RNC sends an authentication request to that IP address via the Internet. The authentication request contains of course the destination IP address as well as the IP address of the originating RNC 6 and a certificate delivered by the mobile terminal 9 to the mobile network together with the IMI. This certificate is generally encrypted and includes the identity of the mobile terminal user. Assuming that the receiving ISP 11 is able to correctly decrypt the received certificate and authenticate the mobile terminal user, an authorisation response is returned from the ISP 11 to the originating RNC 6. The authorisation response includes an accept code which indicates to the RNC 6 that it is authorised to establish a radio link with the mobile terminal 9 and that the ISP 11 will accept any resulting charges. The authorisation response sent by the ISP also includes a return certificate which is again encrypted and is forwarded from the mobile network to the mobile terminal 9. This certificate indicates to the mobile terminal 9 that the mobile network has indeed contacted the correct ISP 11 for authorisation. The transfer of signalling information as described above is further illustrated in FIG. 2.

Figure 3:
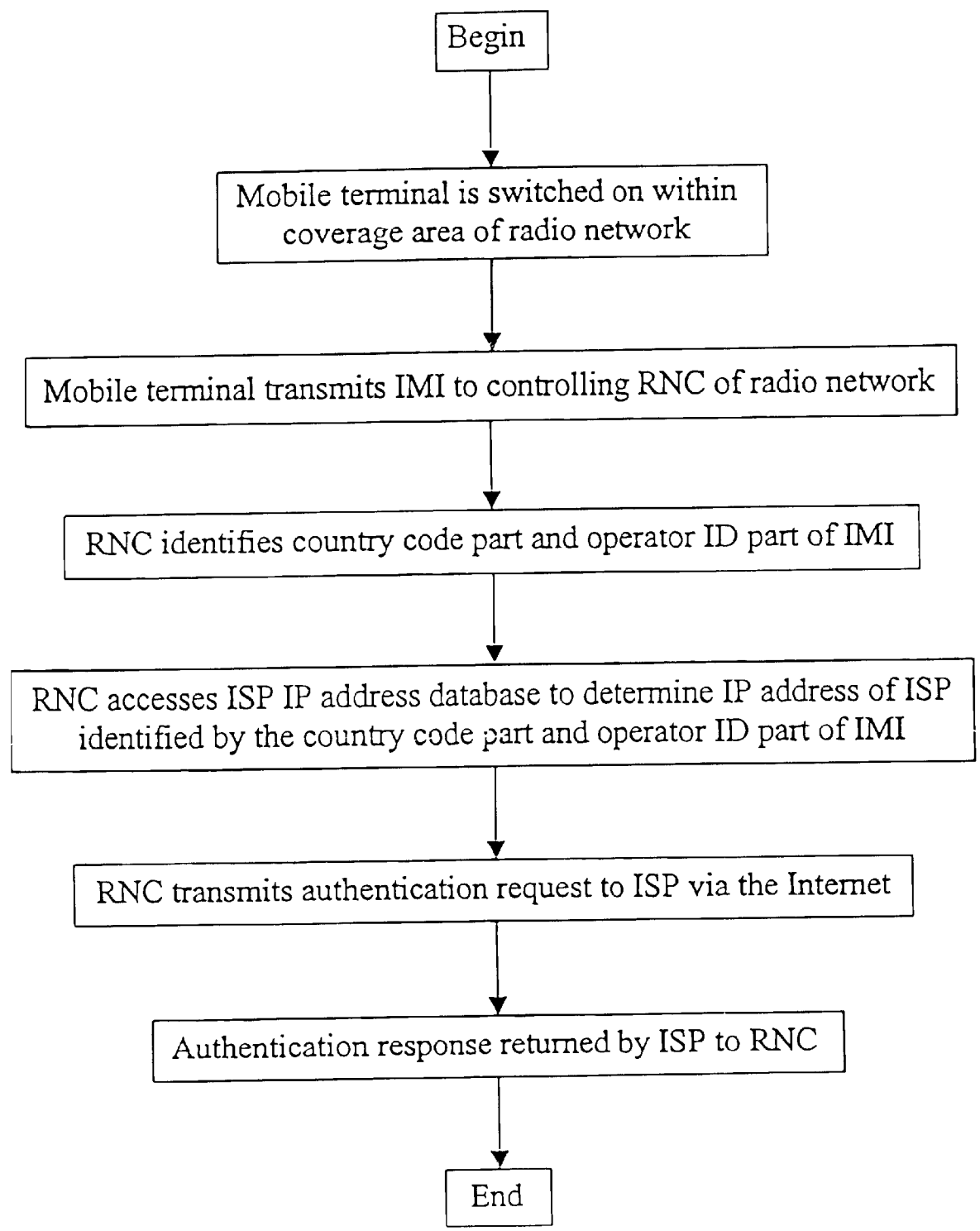
FIG. 3 is a flow diagram illustrating an authentication process used in the network of FIG. 1.

FIG. 3 is a flow diagram further illustrating the method of authenticating a mobile terminal as described above.

It will be appreciated by the person of skill in the art that various modifications may be made to the above described embodiment without departing from the scope of the present invention.

What is claimed is:

1. A method of authenticating a mobile terminal in a communications access network, wherein the mobile terminal subscribes to an Internet Service Provider (ISP) and has a billing relationship therewith, the method comprising:
   allocating to the mobile terminal a unique International Mobile Identity (IMI);
   transmitting the IMI or a part thereof to an access network as part of an initial registration process for the mobile terminal with the network wherein the IMI or said part thereof identifies said ISP;
   receiving the IMI or said part thereof at the access network and using an ISP IP address database to map the IMI or said part thereof to the IP address of the ISP;
   transmitting an authentication request from the access network to the ISP over the Internet using the identified IP address as part of the initial registration process; and the ISP responding to the authentication request by transmitting an authorization response indicating that the access network may establish a radio link with the mobile terminal and that the ISP will accept charges so as to allow users, not subscribing to an access network but rather to the ISP, to attach to access network(s) without disrupting conventional access network registration procedures.

2. A method according to claim 1, wherein the IMI comprises a country code part which identifies the country in which the subscriber's home operator is located, and an operator ID part which identifies the ISP to which the mobile terminal or subscriber subscribes.

3. A method according to claim 2, wherein the IMI comprises a subscriber ID part which identifies the terminal or subscriber within the home ISP.

4. A method according to claim 1, wherein the access network is a mobile telecommunications network and said mobile terminal is a mobile wireless terminal.

5. A method according to claim 4, wherein the mobile network is a Universal Mobile Telecommunications System (UMTS) network which comprises at least one radio network including a plurality of Radio Network Controllers (RNCs), one or more of the RNCs comprising routing and/or address allocation functionality, wherein the mapping of the IMI or part thereof to an ISP IP address is performed at the RNC responsible for the mobile terminal.

6. A method according to claim 1, further comprising sending an authentication certificate, in encrypted form, from the mobile terminal to the access network and forwarding the certificate from the mobile network to the ISP to enable the ISP to authorise the mobile terminal on the basis of the received certificate.

7. A method of authenticating a mobile terminal in a communications access network, wherein the mobile terminal subscribes to an Internet Service Provider (ISP) and has a billing relationship therewith, the method comprising:
   allocating to the mobile terminal a unique International Mobile Identity (IMI);
   transmitting the IMI or a part thereof to an access network as part of an initial registration process for the mobile terminal with the network wherein the IMI or said part thereof identifies said ISP;
   receiving the IMI or said part thereof at the access network and using an ISP IP address database to map the IMI or said part thereof to the IP address of the ISP;
   transmitting an authentication request from the access network to the ISP over the Internet using the identified IP address;
   wherein the IMI comprises a country code part which identifies the country in which the subscriber's home operator is located, and an operator ID part which identifies the ISP to which the mobile terminal or subscriber subscribes; and
   wherein said ISP IP address database comprises a first field containing country code and operator ID parts in combination, and a second field containing ISP IP addresses, whereby the IP address of an ISP can be determined by searching the database using the country code and operator ID parts supplied by a mobile terminal seeking to register with the access network.

8. A method of authenticating a mobile terminal in a communications access network, wherein the mobile terminal subscribes to an Internet Service Provider (ISP) and has a billing relationship therewith, the method comprising:
   allocating to the mobile terminal a unique International Mobile Identity (IMI);

transmitting the IMI or a part thereof to an access network as part of an initial registration process for the mobile terminal with the network wherein the IMI or said part thereof identifies said ISP;

receiving the IMI or said part thereof at the access network and using an ISP IP address database to map the IMI or said part thereof to the IP address of the ISP;

transmitting an authentication request from the access network to the ISP over the Internet using the identified IP address;

wherein the IMI comprises a country code part which identifies the country in which the subscriber's home operator is located, and an operator ID part which identifies the ISP to which the mobile terminal or subscriber subscribes;

wherein the IMI comprises a subscriber ID part which identifies the terminal or subscriber within the home ISP; and wherein said ISP IP address database comprises a first field containing country code and operator ID parts in combination, and a second field containing ISP IP addresses, whereby the IP address of an ISP can be determined by searching the database using the country code and operator ID parts supplied by a mobile terminal seeking to register with the access network.

* * * * *